March 2, 1937.　　　A. C. FISCHER　　　2,072,105
APPARATUS AND METHOD FOR MAKING COMPOSITION STRIPS
Filed Feb. 19, 1930
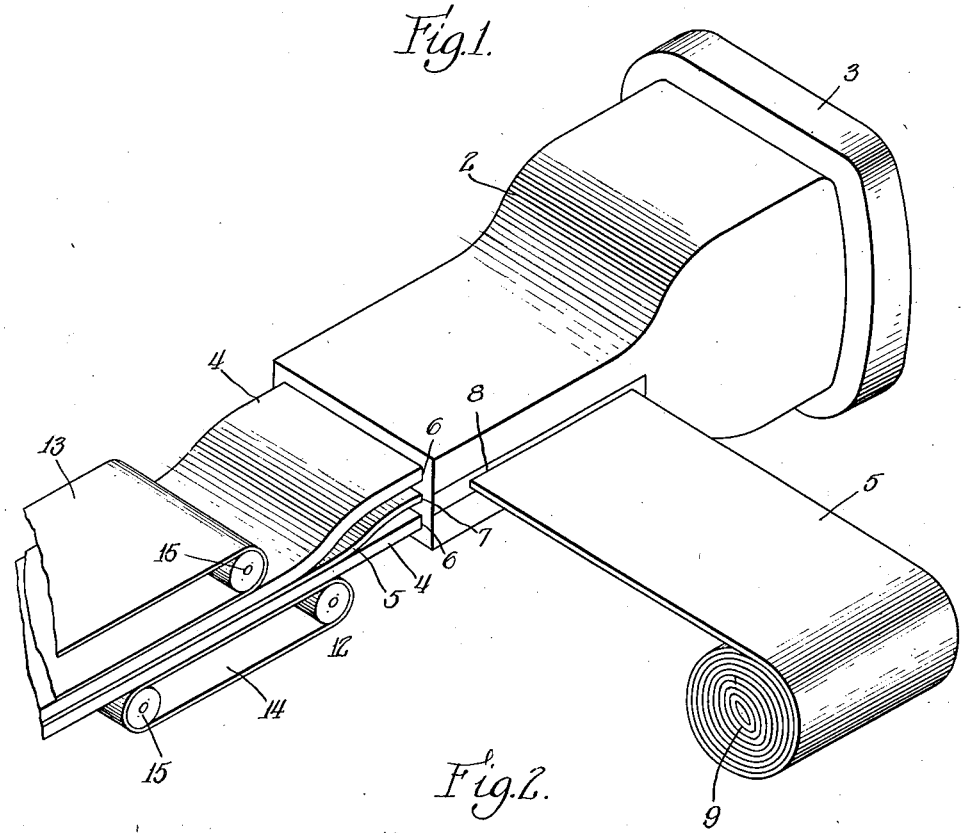
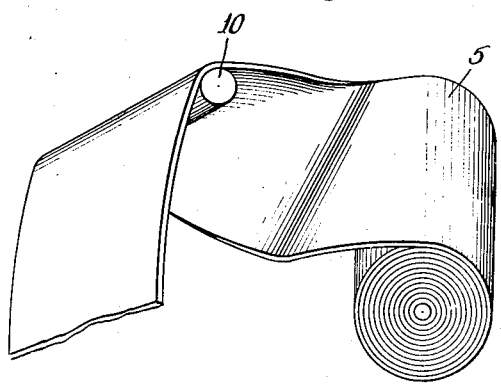
Inventor:—
Albert C. Fischer
By Albert F. Robinson
Atty.

Patented Mar. 2, 1937

2,072,105

UNITED STATES PATENT OFFICE 2,072,105

APPARATUS AND METHOD FOR MAKING COMPOSITION STRIPS

Albert C. Fischer, Chicago, Ill.

Application February 19, 1930, Serial No. 429,556

9 Claims. (Cl. 154—2)

This invention relates to the fabrication of composition constructional strips, and particularly pertains to a laminated structure including a flexible reenforcing foundation layer and a surface covering or coverings of elastic and compressible material.

One of the objects of the invention is to fabricate in a continuous layer operation a composition strip composed of a plurality of layers of compressible and elastic material, such as rubber or bituminous material, fed from an extrusion machine in contact with a reenforcing foundation layer, and compressed into a composite laminated structure. The compressible and elastic material is extruded in a warm plastic condition, thereby securely bonding with the foundation sheet which may advantageously be a waterproof sheet, such as saturated felt.

Another object of the invention is to form such a composition strip without the necessity for inserting successive rolls of the reinforcing sheet between the dies of the extrusion machine. This object is accomplished by feeding the reinforcing sheet from an externally located roll and feeding it at an angle to the direction of supply of the plastic material with an arrangement whereby it may pass in between extruded layers. To this extent this invention is an improvement on the invention of my prior application, Serial No. 374,339, filed June 28, 1929. The present application is therefore directed to this improvement, said prior application being intended to cover such features as are shown therein.

With the foregoing objects in view and others to be mentioned hereafter, the invention consists in the novel and improved construction and arrangement of parts as described and claimed, and as illustrated in the accompanying drawing.

In the drawing:

Figure 1 is a perspective view of a portion of an apparatus which is adapted to be associated with a conventional extrusion machine; and Figure 2 is a detailed view illustrating the course of a reenforcing foundation sheet through an extrusion head.

Referring now to the drawing for a more particular description the invention is typified by the manufacture of a composition strip, block or the like which is adapted to be employed in the constructional material art, especially building and paving for surfacing and/or separating rigid elements.

Numeral 2 designates an extrusion head provided with a flange 3 at one end, whereby it may be bolted or otherwise attached to any conventional extrusive device (not shown) through which any number of plastic layers 4 may be fed preferably in alternation with flexible reenforcing sheets 5. The head may be advantageously heated to retain the layers in a warm plastic condition until they are deposited on the foundation layer, so that they will freely flow through the head. Then too, since the foundation sheet is preferably waterproofed with a saturating medium, the warm plastic layers tend to warm the foundation sheets so that they may be securely bonded together.

The extrusion head is formed with any number of end openings 6 extending longitudinally thereof. Intermediately of these is opening 7 which terminates in a side opening 8 through which the reenforcing sheet is fed from a roll 9 in juxta-position with the plastic layer. A roller 10 or similar means may be conveniently positioned and journaled within the head to retrovert the reenforcing sheet, whereby it may be fed at an angle.

After leaving the extrusion head the juxtaposed layers are fed through a forming device 12. A suitable forming device is typified by endless conveyors 13 and 14, sufficiently spaced apart to receive and compress the juxta-posed layers into a composite laminated structure. The conveyors are circumvolved over rollers 15.

Though I have described with particularity of detail a certain embodiment of the invention, yet it is not to be understood therefrom that the invention is restricted to the particular embodiment disclosed. Various modifications may be made by those skilled in the art without departing from the spirit of the invention.

I claim:

1. The method of fabricating a composition sheet characterized by feeding a plurality of plastic layers in juxta-position, and interposing between these layers a bituminized foundation sheet fed at an angle thereto.

2. The method of fabricating a composition sheet characterized by feeding a plurality of plastic layers longitudinally in juxta-position, feeding a reenforcing sheet at an angle to the layers, retroverting the sheet, and then applying it to the plastic layers.

3. The method of fabricating a composition sheet characterized by feeding a plurality of plastic layers in juxta-position, feeding a reenforcing sheet at an angle to the plastic layers, retroverting and applying the sheet to the plastic layers, and compressing the composite structure.

4. An apparatus for fabricating composition sheets comprising an extrusion device including a head provided with a series of openings through which plastic layers are adapted to be fed from the extruder, and an intervening angular opening through which a reenforcing sheet may be fed from an exterior source.

5. An apparatus for fabricating composition sheets comprising an extrusion device including a head provided with a series of openings leading to the extruder, and an angular opening in justaposition with the first mentioned openings.

6. The method of fabricating a composition sheet characterized by feeding a plurality of plastic masses in a given direction but spaced apart, feeding a reinforcing sheet at an angle to said direction to pass between said plastic masses forming a plastic sheet from each of said masses, carrying said plastic sheets and said reinforcing sheet farther in a single direction and applying said plastic sheets to opposite faces of said reinforcing sheet.

7. The method of fabricating a composition sheet characterized by feeding a plastic mass in two branches in a given direction but spaced apart, feeding a reinforcing sheet at an angle to said direction to pass between said branches forming a plastic sheet from each of said branches, carrying said plastic sheets and said reinforcing sheet farther in a single direction and applying said plastic sheets to opposite faces of said reinforcing sheet.

8. An apparatus for fabricating composition sheets comprising an extrusion device including a head having a plurality of passages extending in one direction and provided with parallel extrusion openings for extruding plastic sheets, and a central opening in juxtaposition with said extrusion opening, means for feeding a foundation sheet into said central opening at an angle to said passages, and for carrying said foundation sheet and said plastic sheets farther in a single direction and applying said plastic sheets to opposite faces of said reinforcing sheet.

9. An apparatus for fabricating composition sheets comprising an extrusion device including a head having a plurality of passages branching from a single chamber and extending in one direction and provided with parallel extrusion openings for extruding plastic sheets, a central opening in juxtaposition with said extrusion opening, means for feeding a foundation sheet into said central opening at an angle to said passages, and for carrying said foundation sheet and said plastic sheets farther in a single direction and applying said plastic sheets to opposite faces of said reinforcing sheet.

ALBERT C. FISCHER.